US012473705B2

(12) United States Patent
Liu et al.

(10) Patent No.: US 12,473,705 B2
(45) Date of Patent: Nov. 18, 2025

(54) SEL-REPORTING MONITOR FOR INTEGRITY AND CONDITIONS OF MANHOLE COVER

(71) Applicants: Zhengzhou Wanmayun Electronic Technology CO., Ltd., Zhengzhou (CN); HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Hong Liu, Zhengzhou (CN); Xi-Juan Luo, Zhengzhou (CN)

(73) Assignees: Zhengzhou Wanmayun Electronic Technology CO., Ltd., Zhengzhou (CN); HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 911 days.

(21) Appl. No.: 17/701,862

(22) Filed: Mar. 23, 2022

(65) Prior Publication Data

US 2023/0134011 A1 May 4, 2023

(30) Foreign Application Priority Data

Oct. 29, 2021 (CN) ......................... 202111276021.2
Oct. 29, 2021 (CN) ......................... 202122639177.4

(51) Int. Cl.
*E02D 29/14* (2006.01)
*H04W 4/80* (2018.01)

(52) U.S. Cl.
CPC .......... *E02D 29/1436* (2013.01); *H04W 4/80* (2018.02); *E02D 2600/10* (2013.01)

(58) Field of Classification Search
CPC . E02D 29/14; E02D 29/1436; E02D 2600/10; H04W 4/80
(Continued)

(56) References Cited

U.S. PATENT DOCUMENTS 5,195,841 A * 3/1993 Mullins .................. G01K 11/06 374/E11.006
10,280,587 B2 * 5/2019 Nachyla .............. E02D 29/1427
(Continued)

FOREIGN PATENT DOCUMENTS

AU 2022277024 A1 * 12/2023 ......... E02D 29/1481
CN 108708405 A * 10/2018
(Continued)

*Primary Examiner* — Gary S Hartmann
(74) *Attorney, Agent, or Firm* — ScienBiziP, P.C.

(57) ABSTRACT

A monitor for monitoring the conditions of and around and under a manhole cover senses current conditions of the manhole cover and enables wireless self-reporting of such conditions at intervals and upon certain emergency situations arising. The monitor of the manhole cover includes a shell, a cover plate, and a base. The cover plate is detachably assembled with the shell. The base connects the shell with the manhole cover. The base includes a magnet to which the manhole cover is strongly attracted. The monitor is held to the manhole cover by the magnet. A mounting operation of the monitor requires only placement by hand.

18 Claims, 6 Drawing Sheets

(58) Field of Classification Search
USPC ............................................................ 404/25
See application file for complete search history.

(56) References Cited

U.S. PATENT DOCUMENTS

| | | | | |
|---|---|---|---|---|
| 11,525,235 | B2 * | 12/2022 | Nunnery | E02D 29/14 |
| 11,939,737 | B2 * | 3/2024 | Nunnery | C08K 3/08 |

FOREIGN PATENT DOCUMENTS

| | | | | | |
|---|---|---|---|---|---|
| CN | 111218956 | A | * | 6/2020 | |
| CN | 112345033 | A | * | 2/2021 | E02D 29/14 |

* cited by examiner

SEL-REPORTING MONITOR FOR INTEGRITY AND CONDITIONS OF MANHOLE COVER

CROSS-REFERENCE TO RELATED APPLICATIONS

This application claims priority to Chinese patent application No. 202111276021.2, filed on Oct. 29, 2021 and Chinese patent application No. 202122639177.4, filed on Oct. 29, 2021, in China National Intellectual Property Administration, which are incorporated herein by reference in its entirety.

FIELD

The subject matter herein generally relates to urban maintenance, specifically relates to a monitor for manhole cover.

BACKGROUND

Smart city becomes a trend of urban development in the world, a manner of managing manhole covers embedded in a road which relies on traditional municipal public facilities manner does not meet a requirement of developing the smart city. The manhole covers relate to a convenience of a city, there is large number of the manhole covers, and managing all of them is difficult. The manhole covers may have issues in sinking, tilting, illegal removal, and theft, the like, which are hard to notice immediately and resolve based on manual inspections. A monitor mounted on the manhole cover can monitor the state of the manhole cover in time. Existing monitors for mounting on the manhole cover need to be installed professionally using tools and auxiliary materials, such as a percussive drill hammer, an electric screwdriver, self-tapping screws, expansion bolts, and the like. It is a complex process.

There is room for improvement in the art.

BRIEF DESCRIPTION OF THE FIGURES

Implementations of the present disclosure will now be described, by way of example only, with reference to the attached figures.

DETAILED DESCRIPTION

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure.

The relationships of orientations or positions denoted by the terms of terms "center", "longitudinal", "lateral", "length", "width", "thickness", "up", "down", "left", "right", "horizontal", "left", "top", "bottom", "inside", "outside", "clockwise", "anticlockwise" used herein refer to those illustrated in the accompany drawings, which are only for conveniently describing the invention and simplifying the description, rather than indicating or implying that a device or member has to be in a specific orientation or configured or operated in a specific orientation. In addition, the terms of "first" and "second" are for the purpose of describing only and should not be constructed to indicate or imply the relative importance. In the present disclosure, the term of "some" means two or more than two, unless otherwise expressly stated.

In the present disclosure, unless otherwise expressly stated, the terms "mounted", "link", and "connect" should be understood broadly, unless otherwise specified and defined, for example, they may be a fixed connection or a removable connection, they may be mechanical connection or electrical connection, and also inner communication between two members, they may direct connection, and also indirect connection via a medium, the skilled persons in the art will understand the meanings of above terms according to specific situations.

In the present disclosure, unless otherwise expressly stated, a structure in which a first feature is "on" or "below" a second feature may include an embodiment in which the first feature is in direct contact with the second feature, and may also include an embodiment in which the first feature and the second feature are not in direct contact with each other, but have an additional feature formed therebetween. Furthermore, a first feature "on," "above," or "on top of" a second feature may include an embodiment in which the first feature is right or obliquely "on," "above," or "on top of" the second feature, or may mean that the first feature is at a height higher than that of the second feature; while a first feature "below," "under," or "on bottom of" a second feature may include an embodiment in which the first feature is right or obliquely "below," "under," or "on bottom of" the second feature, or may mean that the first feature is at a height lower than that of the second feature.

Figure 1:
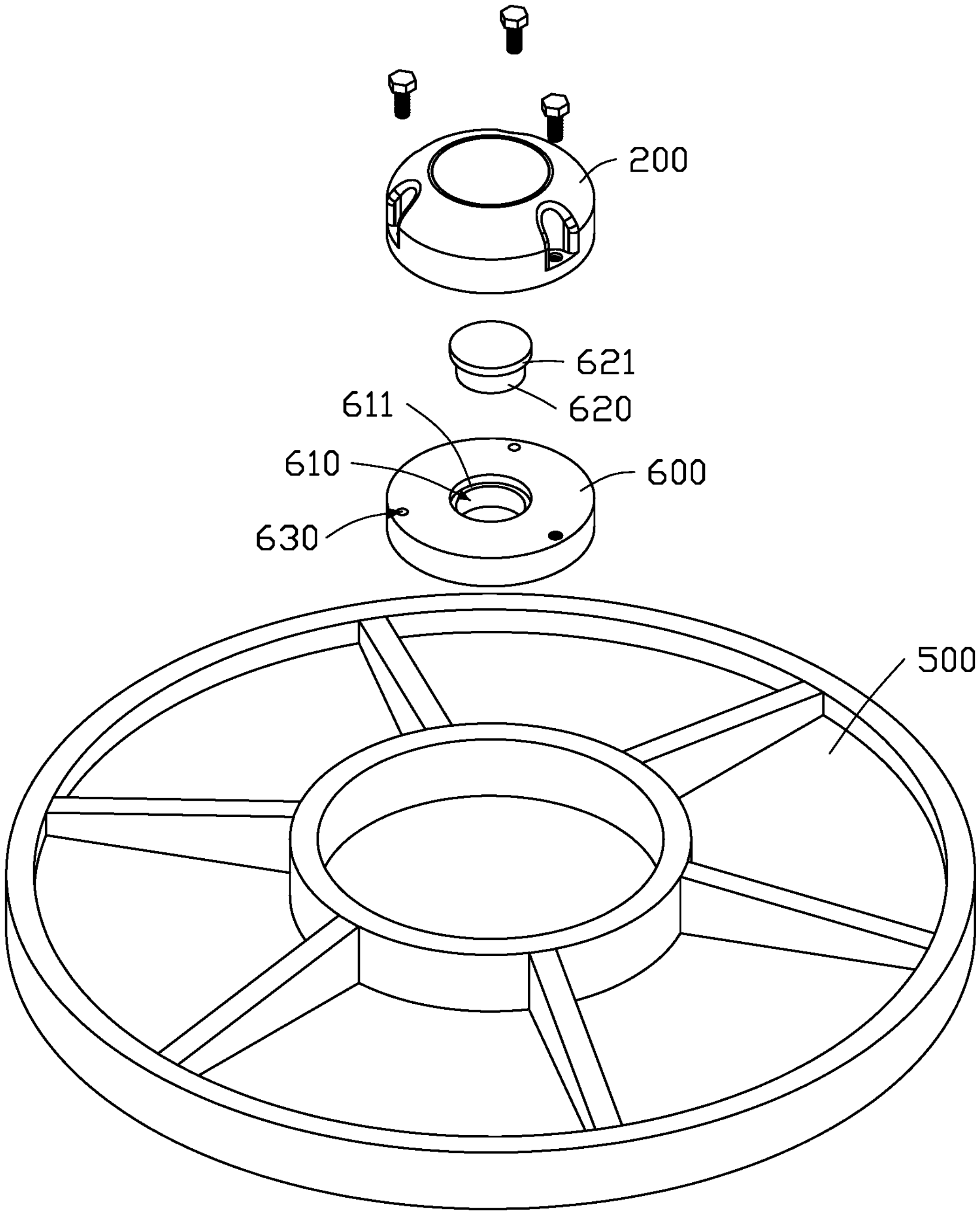
FIG. 1 is an exploded view illustrating an embodiment of a monitor and a manhole cover according to the present disclosure.
Figure 2:
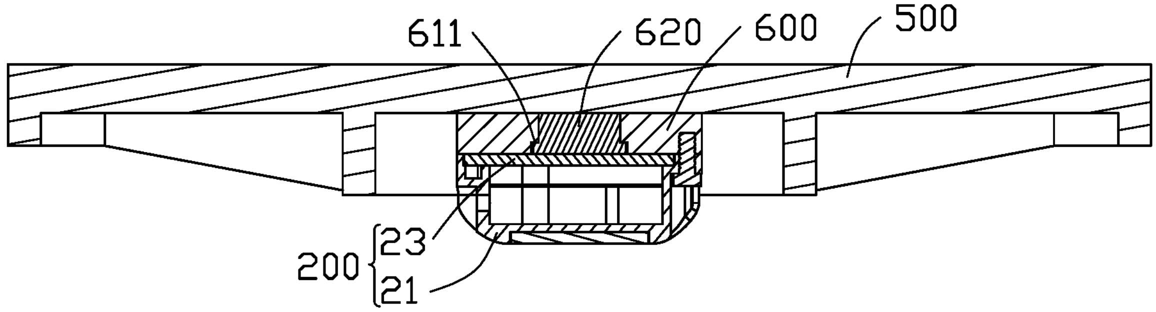
FIG. 2 is a cross-section of the monitor of the disclosure mounted on the manhole cover of FIG. 1 according to the present disclosure.

FIG. 1 shows a monitor 100 and a manhole cover 500. The monitor 100 monitors conditions of the manhole cover 500. As shown in FIG. 2, the monitor 100 includes a casing 200 and a base 600. The casing 200 includes a shell 21 and a cover plate 23.

Figure 3:
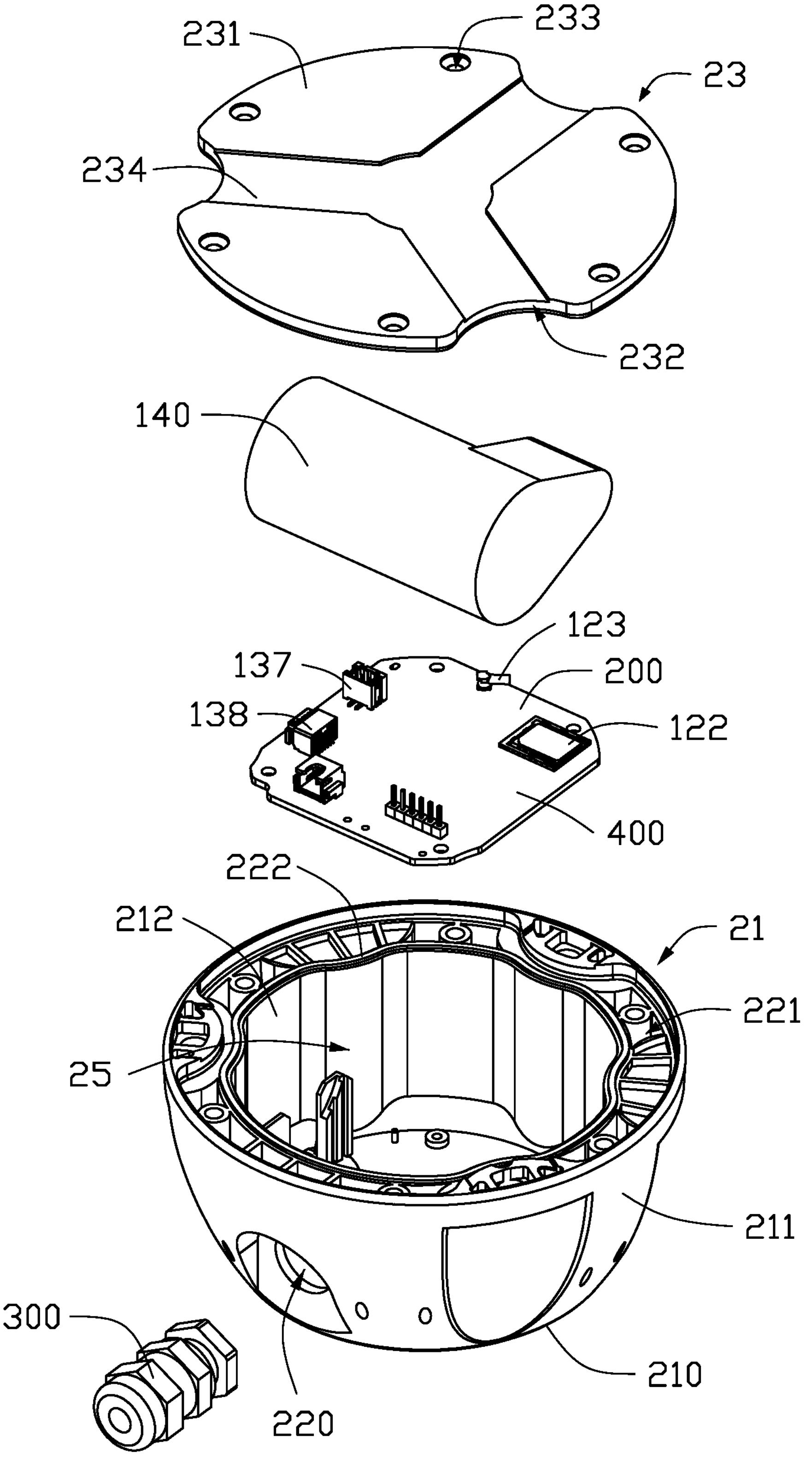
FIG. 3 is an exploded view illustrating an embodiment of the monitor of FIG. 1 according to the present disclosure; the monitor comprising a casing with a shell, a cover, and an extended interface.

FIG. 3 shows an exploded view of the monitor 100. The shell 21 includes a bottom plate 210, an outside wall 211, and an inner wall 212.

The outside wall 211 and the inner wall 212 are disposed on the bottom plate 210. In one embodiment, the bottom plate 210 is substantially flat and horizontal. The outside wall 211 and the inner wall 212 are disposed on edges of the bottom plate 210 and altogether form a substantially hemispherical cavity which is very strongly protected. The bottom plate 210 defines two electrode holes 213. In one embodiment, the two electrode holes 213 are symmetrically disposed.

The bottom plate 210 further defines a slot 214. A label with characteristics of the monitor 100 can be pasted in the slot 214. The label can include a serial number of the monitor 100, a nominal voltage, a nominal current, and the like.

The outside wall 211 defines several inward clamping portions 215 (being concaved to the inner wall 212). A shape and a structure of each clamping portion 215 matches with fingers of a user, convenient for the user for manipulating the monitor 100.

Figure 5:
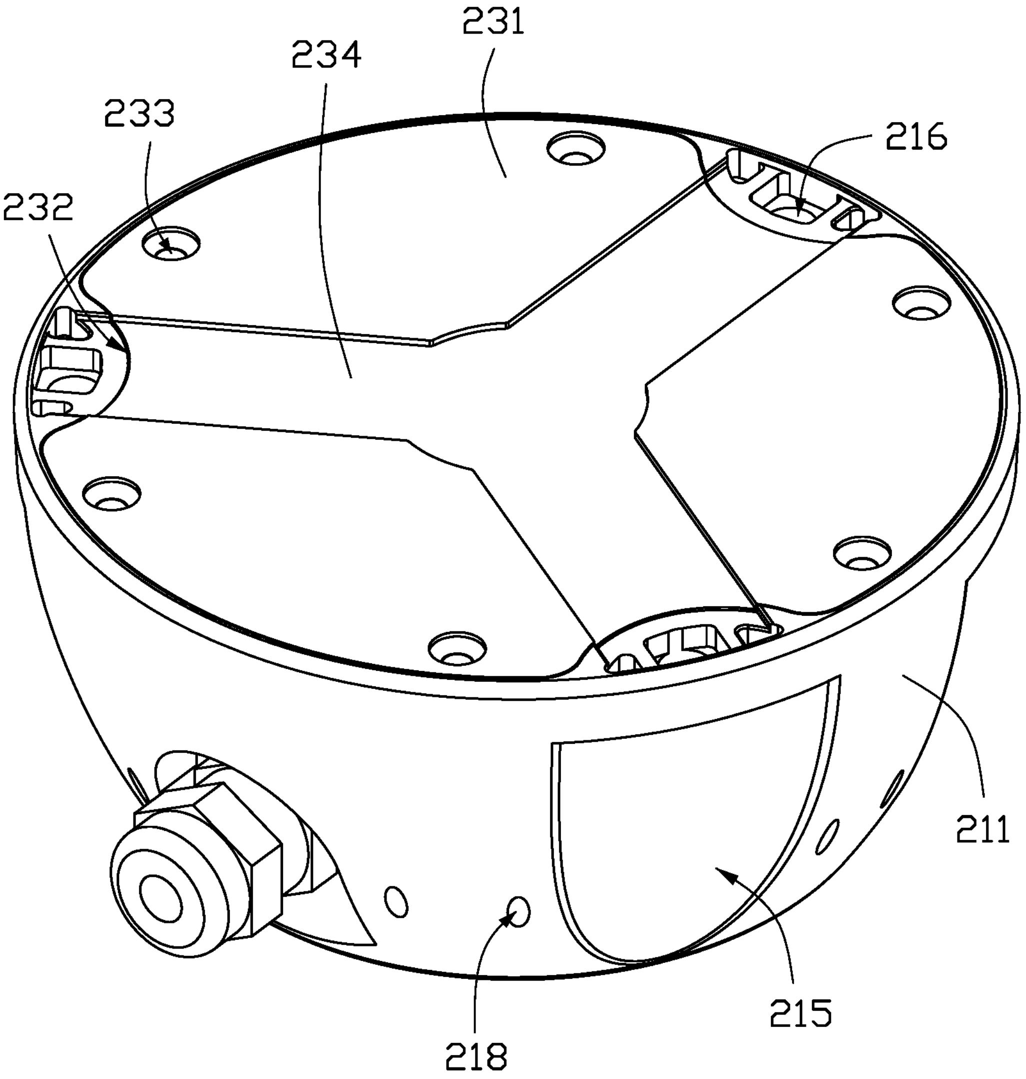
FIG. 5 is a diagram illustrating an embodiment of the casing, the cover plate, and the extended interface of FIG. 3 according to the present disclosure.

In one embodiment, the shell 21 further defines several mounting holes 216. For example, each mounting hole 216 is disposed on the outside wall 211 and is at a bottom wall 217 of each clamping portion 215. The mounting holes 216 cooperate with assembly holes 630 (as shown in FIG. 1) for mounting the base 600. Each mounting hole 216 corresponds to one opening 232 (as shown in FIG. 5).

The outside wall 211 further defines several weep holes 218. Water entering the shell 21 can seep out through the weep holes 218. The number and the position of the weep holes 218 are not limited.

Figure 4:
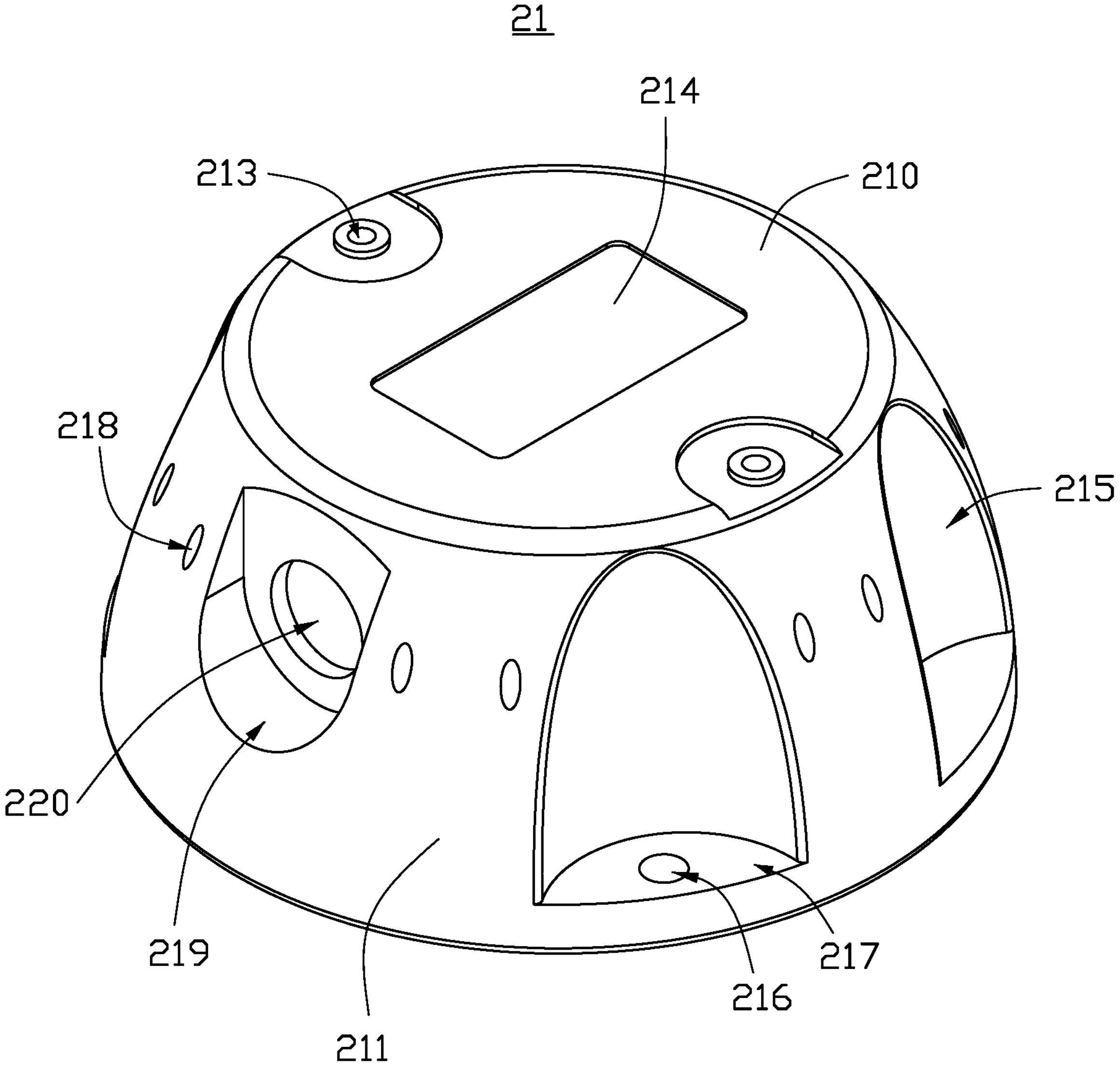
FIG. 4 is a diagram illustrating an embodiment of the shell of FIG. 3 viewed from another angle according to the present disclosure.

Referring to FIG. 4, an inward connection portion 219 is defined in the outside wall 211. The connection portion 219 defines a connecting hole 220 at the bottom surface. The connected hole 220 passes through the outside wall 211 and the inner wall 212.

Referring to FIG. 3, the outside wall 211 and the inner wall 212 connected with the bottom plate 210 are distanced from each other to from a gap 221 therebetween. A seal portion 222 is disposed on the inner wall 212 adjacent to the cover plate 23. The seal portion 222 is used for preventing liquid, such as water, flowing into the shell 21 through a joint between the cover plate 23 and the shell 21. Thus, seepage of water into the shell 21 is avoided.

Referring to FIG. 3, the cover plate 23 and the shell 21 are detachably assembled together to form a receiving space 25.

The cover plate 23 includes a top surface 231. The top surface 231 is substantially circular. The openings 232 are defined at edges of the top surface 231, at constant intervals.

The top surface 231 of the cover plate 23 further defines several connection holes 233. Connection components (not shown) of the shell 21 can pass through the connection holes 233. In one embodiment, the connection component can be a screw, and the connection hole 233 is a screw hole. The cover plate 23 and the shell 21 are assembled together by screwing the connection component into the connection hole 233, and the receiving space 25 is formed.

In one embodiment, positions of the connection holes 233 are not limited. For example, in one embodiment, several mounting slots 234 are defined, radially extending from a middle point of the top surface 231. A number of the mounting slots 234 is equal to that of the openings 232. Each mounting slot 234 extends to the opening 232. Thus, the connection holes 233 can be disposed on opposite sides of the mounting slot 234.

The shell 21 and the cover plate 23 can be made of waterproof material, such as PC/ABS (Polycarbonate/ABS Alloy).

Referring to FIGS. 1 and 2, the base 600 connects with the manhole cover 500 and the casing 200. The base 600 defines a receiving portion 610. The receiving portion 610 is substantially circular. The receiving portion 610 can be a through hole passing through the base 600. The receiving portion 610 can receive a circular magnet 620. The magnet 620 has a strong magnetic attraction for the manhole cover 500.

A stepped portion 611 is disposed at an end of the receiving portion 610 adjacent to the manhole cover 500. A protrusion portion 621 is disposed at an end of the magnet 620. The protrusion portion 621 resists the stepped portion 611 when the magnet 620 is received in the receiving portion 610.

In some embodiments, the receiving portion 610 can be a hollow structure (not shown) in the base 600, and the magnet 620 is received in the hollow structure.

The base defines the assembly holes 630 for connecting with the casing 200. The assembly hole 630 can be a screw hole.

In one embodiment, the casing 200 connects the manhole cover 500 to the base 600. In other embodiments, the shell 21 can be mounted on the manhole cover 500 through a support (not shown) without the base 600. The support can be disposed in the mounting slot 234.

Referring to FIG. 3 again, the monitor 100 further includes a printed circuit board (PCB) 400. The PCB 400 is in the receiving space 25 formed by the shell 21 and the cover plate 23.

Figure 6:
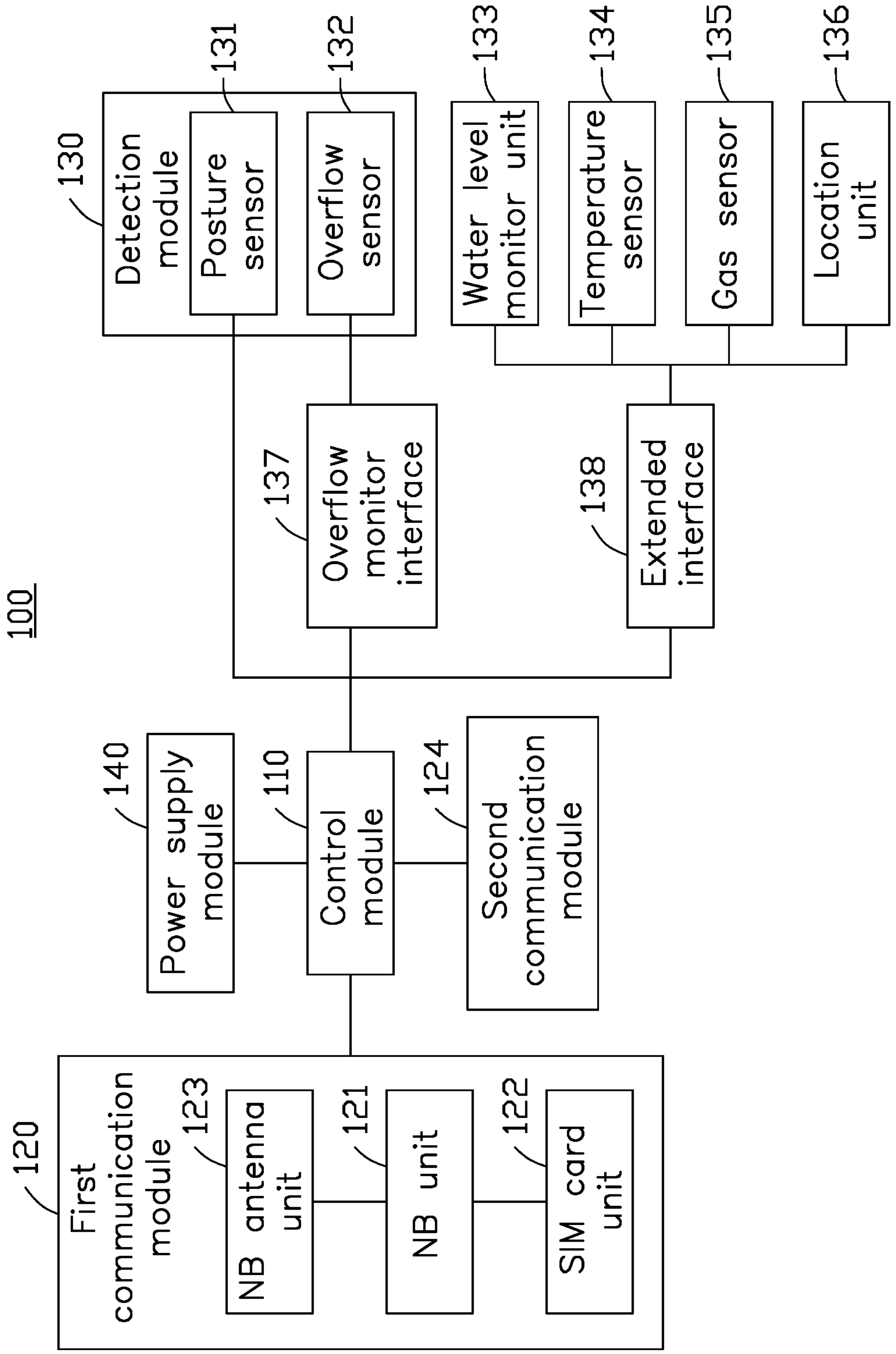
FIG. 6 is a diagram illustrating an embodiment of the monitor of FIG. 1 according to the present disclosure.

FIG. 6 shows the modules in the monitor 100. The monitor 100 includes a control module 110, a first communication module 120, and a detection module 130. The first communication module 120 and the detection module 130 are electrically connected with the control module 110. The first communication module 120 establishes a communication connection between the 100 and external device. The detection module 130 monitors conditions of the manhole cover 500. The control module 110 processes data related to the conditions. The control module 110 can be a microprocessor. In one embodiment, the control module 110 is a BLUETOOTH chip.

In one embodiment, the first communication module 120 uses a narrow band internet of thins (NB-IOT) technology. The first communication module 120 includes a narrow band (NB) unit, a NB antenna unit 123, and a subscriber identity module (SIM) card unit 122. The NB unit 121 is electrically connected with the control module 110. The NB antenna unit 123 is electrically connected with the NB unit 121. The NB antenna unit 123 cooperates with the NB unit 121 for receiving and sending radio frequency (RF) signals, and a wireless communication in multi-band frequency is established. The SIM card unit 122 is electrically connected with the NB unit 1212, for example being embedded in the NB unit 121. The SIM card unit 122 provides communication services from an operator.

In one embodiment, the detection module 130 includes a posture sensor 131. The posture sensor 131 is electrically connected with the control module 110 and senses an angle and a change in the angle of the manhole cover 500. The angle change is converted by the control module 110 to obtain a changed angle value of the manhole cover 500. The control module 110 further compares the changed angle value with a predefined angle value. When the changed angle value is larger than the predefined angle value, the manhole cover 500 is deemed to be in an abnormal state. There can be multiple predefined angle values. The abnormal state can be a sunken state, a tilted state, a displaced state, and the like. Different predefined angle values correspond to different abnormal states respectively. For example, when the changed angle value exceeds 5 degrees, the control module 110 determines the manhole cover 500 is sunken. When the changed angle value exceeds 15 degrees, the control module 110 determines the manhole cover 500 is in the tilted state. When the changed angle value exceeds 60 degrees, the control module 110 determines that the manhole cover 500 is in the displaced state. The predefined angle values can be set according to different requirements, not being limited thereto.

The posture sensor 131 can be a sensor for detecting an angle change of the manhole cover 500. For example, the posture sensor 131 can be one or a combination of a gravity sensor, a three-axis gyroscope, a three-axis acceleration sensor, and the like. In one embodiment, the posture sensor 131 is a three-axis acceleration sensor. When an acceleration of the manhole cover 500 changes, the posture sensor 131 sends a first interrupt signal to the control module 110. The control module 110 calculates acceleration values in different directions for calculating the changed angle value based on the first interrupt signal. Then, the control module 110 determines the state of the manhole cover 500 based on the comparison of the calculated changed angle value and the predefined angle values.

If it is determined that the manhole cover 500 is in the abnormal state, the control module 110 sends a first warning signal to an Internet of Things (IoT) platform through the NB unit 121.

In one embodiment, the monitor 100 further detects a loose state of the manhole cover 500 based on the posture sensor 131 and the control module 110. For example, the control module 110 presets a predefined acceleration value. When the acceleration sensed by the posture sensor 131 exceeds the predefined acceleration value, the control module 110 controls a count value of an embedded vibration counter (not shown) to increment one. The control module 110 periodically transmits the count value to the IoT platform through the NB unit 121. When the accumulated count value of the vibration counter reaches a predefined time value, such as 100, the control module 110 determines that the manhole cover 500 is in the loose state and generates a second warning signal. The second warning signal is transmitted to the IoT platform through the NB unit 121.

In one embodiment, the monitor 100 further includes a second communication module 124. The second communication module 124 is a wireless communication module, such as a BLUETOOTH module. In this embodiment, the second communication module 124 is a BLUETOOTH module, the second communication module 124 can be an independent component, and is electrically connected with the control module 110. The second communication module 124 also can be embedded in the control module 110. The second communication module 124 connects with external terminal by BLUETOOTH. The current conditions of the monitor 100 can be read and set by operators through the external terminal. For example, an uploading frequency of data in the NB unit 121 can be set, the serial number of the monitor 100 and signal intensity of the first communication module 120 and the second communication module 124 can be viewed.

Referring to FIGS. 3 and 6, in one embodiment, the monitor 100 further includes an overflow monitor interface 137. The overflow monitor interface 137 is electrically connected with an overflow sensor 132. The overflow sensor 132 is used for determining whether a level of liquid (run-off rainwater for example) beneath the manhole cover 500 is too high. The overflow sensor 132 can be a water level electrode. When the water level electrode is short-circuited, the liquid level is too high. As shown in FIG. 4, the overflow sensor 132, such as the water level electrode, can be received in the electrode hole 213.

In detail, there are two water level electrodes disposed on the monitor 100. When the water level is below the water level electrodes, the water level electrodes are unconnected and open-circuit. When the water level rises and the water contacts the water level electrodes, the water level electrodes are short-circuited by the dirty water. The overflow sensor 132 generates a second interrupt signal to the control module 110. The control module 110 sends a third warning signal to the IoT platform through the NB unit 121 within a time duration (such as 10 seconds).

When the water level falls, and the level of water is below the water level electrodes, the water level electrodes are open-circuit. The control module 110 sends a third warning all-clear signal to the IoT platform through the NB unit 121 within a certain time duration (such as 1 minute).

In one embodiment, the monitor 100 is inactive. When inactive, the first communication module 120 and the detection module 130 work under a low-power and sleep state. When mounting the monitor 100, the water level electrodes are connected with each other to be short-circuited by a metal wire for a certain time duration, (such as 5 seconds), thus the second communication module 124 can be activated. Then the terminal, such as a phone with an application installed, connects with the monitor 100 through the second communication module 124 for setting. After settings are applied by the application in the phone, the monitor 100 is activated, and the first communication module 120 and the detection module 130 work under a normal state.

By being set as inactive, the monitor 100 is under low-power after leaving factory and before being activated, which increases a life time of the monitor 100.

In one embodiment, the monitor 100 further includes an extended interface 138. The extended interface 138 is electrically connected with the control module 110, and connects with other function modules for extending functions of the monitor 100. For example, the monitor 100 connects with one or more of a water level monitor unit 133, a temperature sensor 134, a gas sensor 135, and a location unit 136 through the extended interface 138. Some of the function modules (such as the water level monitor unit 133) outside of the shell 21 connect with the extended interface 138 through the connection portion 219 (as shown in FIG. 4).

In detail, when the monitor 100 connects with the water level monitor unit 133 through the extended interface 138, the water level monitor unit 133 can determine whether the water level beneath the manhole cover 500 reaches a warning level. For example, when the water level monitor unit 133 is a float switch, the float switch is electrically connected with the control module 11 through a wire and the extended interface 138. A weight is disposed between the float switch and the control module 110. The weight can establish a connection between the float switch and the control module 110 when the water level rises, and cut the connection when the water level falls back down.

The float switch rises with the water level beneath the manhole cover 500, and the float switch also rises. When the water level reaches a position of the weight, the float switch switches from a turned-off state into a turned-on state. The position of the weight is at such level as equals the warning level. When the float switch is in the turned-on state, the control module 110 sends a fourth warning signal to the IoT platform through the NB unit 121. When the water level falls below the position of the weight, the float switch switches from the turned-on state into the turned-off state, the control module 110 sends a fourth warning all-clear signal to the IoT platform through the NB unit 121.

In one embodiment, the monitor 100 further connects with the temperature sensor 134 and the gas sensor 135 through the extended interface 138. The temperature sensor 134 senses a temperature beneath the manhole cover 500, and the gas sensor 135 senses a gas concentration beneath the manhole cover 500. Thus, the temperature and a gas concentration beneath the manhole cover 500 can be sensed in good time by the temperature sensor 134 and the gas sensor 135.

In one embodiment, the monitor 100 further connects with the location unit 136 through the extended interface 138. The location unit 136 acquires position information of the manhole cover 500, and sends the acquired position information to the IoT platform through the NB unit 121. By the location unit 136, the position of the manhole cover 500 can be established. Further, if the manhole cover 500 has been stolen, the current location of the manhole cover 500 can still be established based on the location unit 136.

Referring to FIGS. 3 and 4, the monitor 100 further includes an extended connector 300. An end of the extended connector 300 is electrically connected with the extended interface 138 through a connecting hole 220, and another end of the extended connector 300 is electrically connected with one or more external sensors, such as the water level monitor unit 133, the temperature sensor 134, the gas sensor 135, and the location unit 136. Therefore, the function of the monitor 100 is extended.

Referring to FIG. 3, the control module 110, the first communication module 120, the detection module 130, the overflow monitor interface 137, and the extended interface 138 are disposed on the PCB 400. For example, the control module 110, the NB unit 121 of the first communication module 120, and the posture sensor 131 of the detection module 130 are disposed on a surface of the PCB 400. The overflow monitor interface 137 of the detection module 130, the extended interface 138, and the SIM card unit 122, and the NB antenna unit 123 of the first communication module 120 are disposed on opposite surface of the PCB 400.

Referring to FIGS. 3 and 6, the monitor 100 further includes a power supply module 140. The power supply module 140 electrically connected with the control module 110 powers the control module 110, the first communication module 120, and the detection module 130. In one embodiment, the power supply module 140 is received in the shell 21. The power supply module 140 is pasted on a surface of the cover plate 23 opposite to the top surface 231.

The monitor 100 is strongly held to the manhole cover 500 through the magnet 620 of the base 600, and the base 600 is connected with the shell 21, thus the manhole cover 500 is fixed with the monitor 100. A mounting operation of the monitor 100 is simple, and mounting time for permanent installation is saved.

Besides, many variations and modifications can be made to the above-described embodiment(s) of the disclosure without departing substantially from the spirit and principles of the disclosure. All such modifications and variations are intended to be included herein within the scope of this disclosure and protected by the following claims. The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A manhole cover monitor for monitoring conditions of a manhole cover, the manhole cover monitor comprising:

a shell configured to connect with the manhole cover;

a cover plate detachably assembled with the shell; and a base configured to connect with the shell to the manhole cover; the base comprising a magnet configured to apply a magnetic attraction force to the shell;

wherein the base and the shell are disposed between two opposite sides of the cover plate; two opposite surfaces of the magnet are respectively connected with the cover plate and the manhole cover thereby mounting the cover plate on the manhole cover.

2. The manhole cover monitor of claim 1, wherein the base defines a receiving portion; the receiving portion receives the magnet.

3. The manhole cover monitor of claim 1, wherein the base defines a plurality of assembly holes; the shell comprises a bottom plate, an outside wall, and an inner wall; the outside wall and the inner wall are disposed on edges of the bottom plate and altogether form a substantially hemispherical cavity; the outside wall defines a plurality of mounting holes; the plurality of mounting holes cooperate with a corresponding one of the plurality of assembly holes to fix the base with the shell.

4. The manhole cover monitor of claim 3, wherein the cover plate comprises a top surface; the top surface is substantially circle shaped; openings are defined at edges of the top surface at a constant interval; each of the openings corresponds to one of the plurality of mounting holes and cooperates with the corresponding mounting hole to fix the base.

5. The manhole cover monitor of claim 4, wherein the outside wall and the inner wall are distanced from each other to form a gap therebetween; a seal portion is disposed on the inner wall adjacent to the cover plate.

6. The manhole cover monitor of claim 1, wherein the manhole cover monitor further comprises a control module, a detection module, and a first communication module; the detection module and the first communication module are electrically connected with the control module; the detection module comprises at least one sensor unit configured for sensing conditions of the manhole cover; the control module processes data related to the conditions sensed by the detection module; the first communication module establishes a communication between the manhole cover monitor and external devices.

7. The manhole cover monitor of claim 6, wherein the first communication module comprises a narrow band (NB) unit, a subscriber identity module (SIM) card unit, and a NB antenna unit; the NB unit being electrically connected with the control module establishes a wireless communication in multi-band frequency; the SIM card unit being electrically connected with the NB unit provides communication services from an operator; the NB antenna unit being electrically connected with the NB unit receives and sends radio frequency signals.

8. The manhole cover monitor of claim 6, wherein the at least one sensor unit comprises a posture sensor; the posture sensor being electrically connected with the control module senses an angle, and an angle change of the manhole cover; the angle change is converted by the control module to obtain a changed angle value of the manhole cover; the control module further compares the changed angle value with a predefined angle value; when the changed angle value is larger than the predefined angle value, the manhole cover is deemed to be in an abnormal state.

9. The manhole cover monitor of claim 8, wherein the posture sensor further senses an acceleration change; the control module presets a predefined acceleration value; when the acceleration sensed by the posture sensor exceeds the predefined acceleration value, the control module counts a times of the acceleration being exceeded the predefined acceleration value; when the accumulated times reaches a predefined time value, the control module determines that the manhole cover is in a loose state.

10. The manhole cover monitor of claim 6, wherein the manhole cover monitor further comprises an overflow monitor interface; the overflow monitor interface is electrically connected with the control module; the detection module further comprises an overflow sensor; the overflow sensor comprises water level electrodes; the water level electrodes are electrically connected with the overflow monitor interface, whether a level of liquid beneath the manhole cover is too high is determined by the water level electrodes and the overflow monitor interface.

11. The manhole cover monitor of claim 10, wherein when a water level is below the water level electrodes, the water level electrodes are be open-circuit, it is deemed the level of the liquid beneath the manhole cover to be fine; when the water level rises and the water contacts with the water level electrodes, the water level electrodes are be short-circuited through the water, it is deemed the level of the liquid beneath the manhole cover to be too high.

12. The manhole cover monitor of claim 6, wherein the manhole cover monitor further comprises an extended interface; the extended interface is electrically connected with the control module, and further is electrically connected with the at least one sensor unit for extending functions of the manhole cover monitor.

13. The manhole cover monitor of claim 12, wherein the manhole cover monitor connects with a water level monitor unit through the extended interface, the water level monitor unit determines whether the water level beneath the manhole cover reaches a warning level.

14. The manhole cover monitor of claim 12, wherein the manhole cover monitor further connects with a temperature sensor through the extended interface, the temperature sensor senses a temperature beneath the manhole cover and provides the temperature to the control module.

15. The manhole cover monitor of claim 12, wherein the manhole cover monitor further connects with a gas sensor through the extended interface; the gas sensor senses a gas concentration beneath the manhole cover and provides the gas concentration to the control module.

16. The manhole cover monitor of claim 12, wherein the manhole cover monitor further connects with a location unit through the extended interface; the location unit acquires position information of the manhole cover and sends the acquired position information to an Internet-of-Things platform through the first communication module.

17. The manhole cover monitor of claim 12, wherein the shell defines a connecting hole; the connecting hole cooperates with the at least one sensor unit for extending the functions of the manhole cover monitor.

18. A manhole cover monitor for monitoring conditions of a manhole cover, the manhole cover monitor comprising:

a shell configured to connect with the manhole cover;

a cover plate detachably assembled with the shell;

a base configured to connect with the shell to the manhole cover; the base comprising a magnet configured to apply a magnetic attraction force to the shell;

a detection module, configured to sense conditions of the manhole cover; and a control module, configured to process data related to the conditions sensed by the detection module;

wherein the detection module comprises at least one sensor unit; the at least one sensor unit comprises a posture sensor; the posture sensor senses an acceleration change; the control module presets a predefined acceleration value; when the acceleration sensed by the posture sensor exceeds the predefined acceleration value, the control module counts a times of the acceleration being exceeded the predefined acceleration value; when the accumulated times reaches a predefined time value, the control module determines that the manhole cover is in a loose state.

* * * * *